Dec. 11, 1928.
A. E. ANDERSON
1,695,003
CONTROL OF ELECTRIC SWITCHES
Filed March 19, 1927
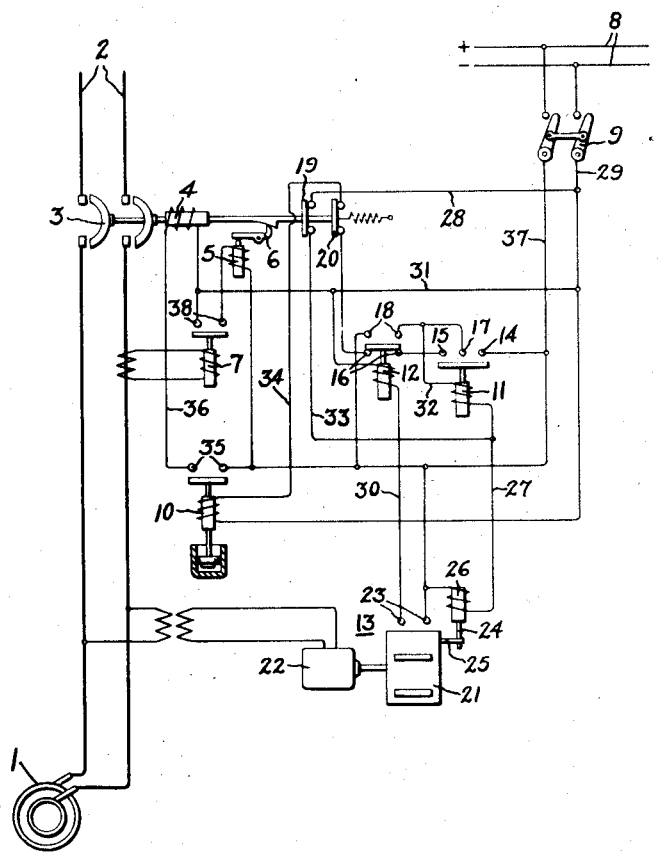
Inventor:
Arvid E. Anderson,
by *Alexander S. Lunt*
His Attorney.

Patented Dec. 11, 1928.

1,695,003

UNITED STATES PATENT OFFICE.

ARVID E. ANDERSON, OF SCOTIA, NEW YORK, ASSIGNOR TO GENERAL ELECTRIC COMPANY, A CORPORATION OF NEW YORK.

CONTROL OF ELECTRIC SWITCHES.

Application filed March 19, 1927. Serial No. 176,761.

My invention relates to the control of electric switches and particularly to the control of switches, such as circuit breakers, which are automatically opened on the occurrence of abnormal circuit conditions and which are arranged to be closed by the operation of suitable control switches to complete the circuit of electromagnetic means arranged to close the circuit breakers.

If a control switch remains in its circuit closing position after the circuit breaker closes and the circuit breaker immediately opens due to an abnormal condition on the circuit it controls, obviously the closing circuit of the circuit breaker is again completed as soon as the circuit breaker reaches its open position and the circuit breaker is again closed. Under these conditions the circuit breaker continues to open and close rapidly while the abnormal condition lasts and the control switch remains in its circuit closing position. This action or so-called pumping, if allowed to continue, may result in serious damage to the apparatus.

My invention is of particular utility in automatic reclosing circuit breaker systems in which the closing circuit of a circuit breaker is automatically completed after the circuit breaker has been opened in response to an abnormal condition and has remained opened for a certain time. In such systems it is the practice to provide suitable automatic switching means which effects the completion of the closing circuit of the circuit breaker in the desired manner. If for any reason the automatic switching means should stop in its circuit closing position, the circuit breaker controlled thereby would open and close repeatedly, as previously described, while an abnormal condition such as an over-current, for example, existed on the circuit controlled by the circuit breaker.

An object of my invention is to provide an improved arrangement for preventing the repeated opening and closing of a circuit breaker under the previously mentioned conditions.

My invention will be better understood from the following description taken in connection with the accompanying drawing, which shows an automatic reclosing circuit breaker system embodying my invention, and its cope will be pointed out in the appended claims.

In the arrangement illustrated in the drawing, an alternating current generator 1 is arranged to be connected to a circuit 2 by suitable interrupting means such as a circuit breaker 3. Although I have shown an alternating current system, my invention is not limited thereto, but may be used in a direct current system.

As shown, the circuit breaker 3 is of the latched closed type and is provided with suitable closing means, illustrated as comprising a closing winding such as a solenoid coil 4, and with a trip coil 5 which is arranged when energized to release the latch 6 and thereby to effect the opening of the circuit breaker. The circuit of the trip coil 5 is controlled by an over-current relay 7 which is arranged to be energized in accordance with the current in the circuit of the generator 1. This relay through its contacts is arranged to connect the trip coil 5 across a suitable control source 8 when the control switch 9 is closed and the current supplied by the generator 1 exceeds a predetermined value.

For effecting the closing of the circuit breaker 3, I provide means comprising a closing relay 10 and controlling means therefor comprising an auxiliary relay 11, a control relay 12, and an automatic switching means 13 operative in response to the opening of the circuit breaker for effecting the energization of the control relay.

The closing relay 10 as illustrated may be of the instantaneous closing time delay opening type so as to allow sufficient time for the circuit breaker to be latched on the closing movement thereof. The auxiliary relay 11 through its contacts 14, 15, and the control relay 12 through its contacts 16 jointly control the circuit of the winding of the closing relay 10. The auxiliary relay 11 is arranged to be energized only when the circuit breaker 3 is open and when energized, to close its contacts 14, 17 so as to maintain itself energized while the circuit breaker is open and to close its contacts 14, 15 in the circuit of the winding of the closing relay 10. The control relay 12 is arranged when deenergized to close its contacts 16 which are in series with the contacts 14, 15 of the auxiliary relay in the circuit of the winding of the closing relay and when energized to open its contacts 16 and close its contacts 18 in the circuit of the winding of the auxiliary relay 11. The circuit breaker is provided with auxiliary switches 19, 20 arranged, when the circuit breaker 3 is open, to close contacts in the circuits of the windings of the auxiliary relay 11 and the closing relay 10 respectively.

The automatic switching means 13 illustrated comprises a controller 21 and driving means therefor such as a motor 22 which is permanently connected across the circuit of the generator 1. The controller is provided with a set of contacts 23 which are adapted to be closed at predetermined intervals by the segments on the controller 21 as it is rotated by the motor 22. The motor is normally prevented from rotating by a stop 24 which engages a projection 25 on the controller and which is arranged to be disengaged by means of a release magnet 26 which is arranged to be energized from the control source 8 through the circuit breaker auxiliary switch 19 whenever the circuit breaker opens while the switch 9 is closed. The contacts 23 of the switching means 13 are in the circuit of the winding of the control relay 12 so that it is energized whenever these contacts are closed.

Assuming that the parts are positioned as shown in the drawing and that the control switch 9 is closed so as to render the automatic switching means 13 operative, the operation of the illustrated embodiment of my invention is as follows: The circuit breaker being open and the auxiliary switch 19 closed, the release magnet 26 is energized from the source 8 through a circuit comprising the conductor 37, the winding of the release magnet 26, the conductors 27 and 33, the auxiliary switch 19, and the conductors 28 and 29. Since the stop 24 is now out of the path of movement of the projection 25, the motor 22 is free to and will rotate the controller 21 if the source 1 is energized. When a segment of the controller 21 closes the contacts 23, the control relay 12 is energized from the source 8 through a circuit comprising the conductor 37, the contacts 23, the conductor 30, the winding of the control relay 12, and the conductors 31 and 29. The control relay 12 opens its contacts 16 and closes its contacts 18 thereby completing the circuit of the winding of the auxiliary relay 11 as follows: the conductor 37, the contacts 18, the conductor 32, the winding of the auxiliary relay 11, the conductor 33, the auxiliary switch 19, and the conductors 28 and 29. The auxiliary relay 11 upon energization closes its contacts 14, 15, 17 thereby completing its own circuit as follows: the conductor 37, the contacts 14, 17, the conductor 32, the winding of the auxiliary relay 11, the conductor 33, the auxiliary switch 19, and the conductors 28 and 29. When the controller has rotated enough to open its contacts 23, the circuit of the control relay 12 is opened. This relay being thus deenergized opens its contacts 18 and closes its contacts 16, thereby completing the circuit of the closing relay 10 as follows: the conductor 37, the contacts 14 and 15 of the auxiliary relay 11, the contacts 16 of the control relay 12, the auxiliary switch 20, the conductor 34, the winding of the closing relay 10 and the conductor 29. The closing relay 10 through its contacts 35 completes the circuit of the closing coil 4 as follows: the conductor 37, the contacts 35, the conductor 36, the closing coil 4, and the conductors 31 and 29. The closing of the circuit breaker 3 effects through the opening of the auxiliary switch 19 the deenergization of the release magnet 26 and the auxiliary relay 11.

If there is no over-current condition on the circuit 2, the circuit breaker 3 is held in the closed position by its latch 6. The motor 22 continues to drive the controller 21 until the projection 25 engages the stop 24 which is now in the path of movement of the projection since the release magnet 26 is deenergized by the opening of the circuit breaker auxiliary switch 19. During the movement of the controller 21 subsequent to the closing of the circuit breaker 3, the controller segments do not complete any circuits through the contacts 23 if the circuit breaker remains closed.

If there is an overload on the circuit 2 when the circuit breaker 3 closes, the over-current relay 7 operates and through its contacts 38 and conductors 37, 31 and 29 connects the trip coil 5 to the source 8. Consequently as soon as the closing coil 4 is deenergized, the circuit breaker 3 opens and the cycle of operation heretofore described is repeated. The mere opening of the circuit breaker 3, that is, the closing of the auxiliary switches 19 and 20, does not effect the immediate closing of the circuit breaker as it is necessary for the controller 21 to again close the contacts 23 and for the auxiliary and control relays 11 and 12 to go through the cycle of operation previously described. Since the control relay 12 must be deenergized before the circuit breaker can be closed, it is apparent that the contacts 23 of the switching means 13 must both close and open before the circuit breaker can close, thus overcoming any possible pumping action of the circuit breaker in case the contacts of the switching means remain closed.

With the arrangement shown, the reclosing equipment will continue to reclose the circuit breaker 3 at predetermined intervals so long as an over-current condition exists on the circuit 2, but it is obvious that suitable means, examples of which are well-known in the art, may be provided to prevent the reclosing equipment from effecting the reclosing of the circuit breaker after it has been reclosed a predetermined number of times. The time interval between successive reclosures may be made any desired value by suitable spacing of the controller segments.

While I have shown and described my invention as applied to an automatic reclosing circuit breaker system in which the contacts 23 are arranged to be closed automatically, it is obvious that my invention is equally applicable to systems in which these contacts are closed manually. It will be obvious to those skilled in the art that my invention is capable of various modifications and accordingly I do not desire to be limited to the exact arrangement shown and described, but seek to cover in the appended claims all modifications which fall within the true spirit and scope of my invention.

What I claim as new and desire to secure by Letters Patent of the United States, is:

1. In combination, an electric circuit, interrupting means therefor, means for effecting the closing of the interrupting means including a closing relay and means for controlling the closing relay including an auxiliary relay arranged when energized to close contacts in the circuit of its winding, and a control relay arranged when energized to effect the energization of the auxiliary relay only while the interrupting means is open and on subsequent deenergization while the auxiliary relay is energized to complete the circuit of the closing relay.

2. In combination, an electric circuit, interrupting means therefor, means for effecting the closing of the interrupting means including a closing relay and means for controlling the closing relay including an auxiliary relay arranged when energized to close contacts in the circuit of its winding, and a control relay arranged when energized to effect the energization of the auxiliary relay only while the interrupting means is open and on subsequent deenergization while the auxiliary relay is energized to complete the circuit of the closing relay, and means operative in response to the opening of the interrupting means for effecting the energization of the control relay.

3. In combination, a circuit breaker, closing means therefor including a winding, a closing relay for controlling the circuit of said winding and means for controlling the circuit of the winding of the closing relay including an auxiliary relay arranged to be energized only when the circuit breaker is open and when energized to close contacts in the circuit of the winding of the closing relay, and a control relay arranged when deenergized to close contacts in series with the contacts of the auxiliary relay in the circuit of the winding of the closing relay and when energized to open said series contacts and to close contacts in the circuit of the auxiliary relay.

4. In combination, a circuit breaker, closing means therefor including a winding, a closing relay for controlling the circuit of said winding and means for controlling the circuit of the winding of the closing relay including an auxiliary relay arranged to be energized only when the circuit breaker is open and when energized to close contacts in the circuit of the winding of the closing relay, a control relay arranged when deenergized to close contacts in series with the contacts of the auxiliary relay in the circuit of the winding of the closing relay and when energized to open said series contacts and to close contacts in the circuit of the auxiliary relay, and electromagnetic means responsive to the opening of the circuit breaker for effecting the energization of the control relay.

5. In combination, a circuit breaker, closing means therefor including a winding, a closing relay for controlling the circuit of said winding, and means for controlling the circuit of the winding of the closing relay including an auxiliary relay arranged to be energized only when the circuit breaker is open and when energized to maintain the circuit of its own winding while the circuit breaker is open and also to close contacts in the circuit of the winding of the closing relay, and a control relay arranged when deenergized to close contacts in series with the contacts of the auxiliary relay in the circuit of the winding of the closing relay and when energized to open said series contacts and to close contacts in the circuit of the auxiliary relay.

6. In combination, a circuit breaker, closing means therefor including a winding, a closing relay for controlling the circuit of said winding, and means for controlling the circuit of the winding of the closing relay including an auxiliary relay arranged to be energized only when the circuit breaker is open and when energized to maintain the circuit of its own winding while the circuit breaker is open and also to close contacts in the circuit of the winding of the closing relay, a control relay arranged when deenergized to close contacts in series with the contacts of the auxiliary relay in the circuit of the winding of the closing relay and when energized to open said series contacts and to close contacts in the circuit of the auxiliary relay, and electromagnetic means responsive to the opening of the circuit breaker for effecting the energization of the control relay.

7. In combination, a circuit breaker, closing means for said circuit breaker, a relay, switching means for energizing and deenergizing said relay, a second relay arranged to be energized by said first relay when in its energized position, said first relay and second relay being arranged to cause operation of said closing means only when the first relay is deenergized and the second relay energized, whereby said switching means must operate both to energize and subsequently deenergize said first relay before said circuit breaker can close.

8. In combination, a circuit breaker, electromagnetic means arranged when energized to effect the closing of the circuit breaker, means for controlling said electromagnetic means including a relay arranged when deenergized to complete the circuit of said electromagnetic means, switching means for making and breaking the circuit of said relay, said controlling means being arranged to cause operation of said electromagnetic means only after said relay has been energized and subsequently deenergized by said switching means.

In witness whereof, I have hereunto set my hand this 18th day of March, 1927.

ARVID E. ANDERSON.